(12) United States Patent
Rout et al.

(10) Patent No.: US 10,287,527 B2
(45) Date of Patent: May 14, 2019

(54) ECO-FRIENDLY PROCESS FOR THE ISOLATION OF BIOPOLYMERS FROM AGRICULTURAL RESIDUES

(71) Applicant: Council of Scientific and Industrial Research, New Delhi (IN)

(72) Inventors: Prasanta Kumar Rout, Lucknow (IN); Ashween Deepak Nannaware, Lucknow (IN); Om Prakash, Lucknow (IN); Ram Rajasekharan, Karnataka (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 15/527,688

(22) PCT Filed: Dec. 1, 2015

(86) PCT No.: PCT/IN2015/050183
§ 371 (c)(1),
(2) Date: May 17, 2017

(87) PCT Pub. No.: WO2016/088139
PCT Pub. Date: Jun. 9, 2016

(65) Prior Publication Data
US 2018/0201870 A1    Jul. 19, 2018

(30) Foreign Application Priority Data
Dec. 1, 2014    (IN) .......................... 3481/DEL/2014

(51) Int. Cl.
*C11B 1/10* (2006.01)
*C08B 37/00* (2006.01)
(Continued)

(52) U.S. Cl.
CPC ............ *C11B 1/10* (2013.01); *B01D 11/0284* (2013.01); *B01D 11/0288* (2013.01);
(Continued)

(58) Field of Classification Search
CPC ..... C11B 1/00; C08B 37/003; C08B 37/0057; C08H 8/00; B01D 11/0284; B01D 11/0288
See application file for complete search history.

(56) References Cited

U.S. PATENT DOCUMENTS
2014/0048221 A1    2/2014 Li et al.

FOREIGN PATENT DOCUMENTS
CN    103088692    5/2013
WO    WO-2013044042    3/2013
(Continued)

OTHER PUBLICATIONS

"International Application No. PCT/IN2015/050183, International Search Report and Written Opinion dated Apr. 4, 2016", (dated Apr. 4, 2016), 10 pgs.
(Continued)

*Primary Examiner* — Yate' K Cutliff
(74) *Attorney, Agent, or Firm* — Schwegman Lundberg & Woessner, P.A.

(57) ABSTRACT

Agricultural residues (biomasses) have come-up as potential valuable renewable resources for transformation into many bio-products. To achieve this goal, the isolation of major biopolymers in their purest form through an economical process is demanded for synthesis of the target fine chemicals without impurities. However, the difficulty of fractionating the biomass into cellulose, hemicellulose and lignin by a simple method has greatly limited their isolation from agricultural residues. Also, the lipids and waxes present on the surface of the agricultural residues protect it from
(Continued)

Schematic diagram of isolation of lipids and bio-polymers from the agricultural residues external chemical and microbial agents. To overcome this issue, the lipids and waxes have been isolated from the biomass through two step organic solvents extraction. Thereafter lignin, hemicellulose and cellulose are isolated successively from the de-waxed biomass.

9 Claims, 1 Drawing Sheet

(51) Int. Cl.
  *C08H 8/00* (2010.01)
  *B01D 11/02* (2006.01)
  *C11B 7/00* (2006.01)
(52) U.S. Cl.
  CPC ...... *C08B 37/0003* (2013.01); *C08B 37/0057* (2013.01); *C08H 8/00* (2013.01); *C11B 7/0058* (2013.01)

(56) References Cited

FOREIGN PATENT DOCUMENTS

| WO | WO 2013/102911 A1 | * | 7/2013 | ........... C07D 307/46 |
|---|---|---|---|---|
| WO | WO-2013102911 | | 7/2013 | |
| WO | WO-2013162881 | | 10/2013 | |
| WO | WO-2016088139 | | 6/2016 | |

OTHER PUBLICATIONS

Naik, S. N., et al., "Production of first and second generation biofuels: A comprehensive review", Renewable and Sustainable Energy Reviews 14 (2010) 578-597, (2010), 578-597.

Naik, Satyanarayan, et al., "Characterization of Canadian biomass for alternative renewable biofuel", Renewable Energy, vol. 35, Issue 8, Aug. 2010, pp. 1624-1631, (Feb. 18, 2010), 1624-1631.

Behera, Shuvashish, et al., "Importance of chemical pretreatment for bioconversion of lignocellulosic biomass", *Renewable and Sustainable Energy Reviews*, 36, (2014), 91-106.

Isogai, A., et al., "Dissolution of Cellulose in Aqueous NaOH Solutions", *Cellulose*, 5(4), (1998), 309-319.

Lee, Jae-Won, et al., "Efficiencies of acid catalysts in the hydrolysis of lignocellulosic biomass over a range of combined severity factors", *Bioresource Technology*, 102(10), (2011), 5884-5890.

Li, Ming-Fei, et al., "Cold sodium hydroxide/urea based pretreatment of bamboo for bioethanol production: Characterization of the cellulose rich fraction", *Industrial Crops and Products*, 32(3), (2010), 551-559.

Sasmal, Soumya, et al., "Characterization of biomasses available in the region of North-East India for production of biofuels", *Biomass and Bioenergy*, 45, (2012), 212-220.

Vom Stein, Thorsten, et al., "From biomass to feedstock: one-step fractionation of lignocellulose components by the selective organic acid-catalyzed depolymerization of hemicellulose in a biphasic system", *Green Chem.*, 13, (2011), 1772-1777.

* cited by examiner

Schematic diagram of isolation of lipids and bio-polymers from the agricultural residues

ECO-FRIENDLY PROCESS FOR THE ISOLATION OF BIOPOLYMERS FROM AGRICULTURAL RESIDUES

PRIORITY CLAIM TO RELATED APPLICATIONS

This application is a U.S. national stage application filed under 35 U.S.C. § 371 from International Application Serial No. PCT/IN2015/050183, which was filed 1 Dec. 2015, and published as WO2016/088139 on 9 Jun. 2016, and which claims priority to India Application No. 3481/DEL/2014, filed 1 Dec. 2014, which applications and publication are incorporated by reference as if reproduced herein and made a part hereof in their entirety, and the benefit of priority of each of which is claimed herein.

FIELD OF INVENTION

The present invention relates to an eco-friendly, efficient and economical process for the isolation of biopolymers such as lipids, cellulose, hemicellulose and lignin from agricultural residues. The present invention further relates to the preparation of new solvent systems such as imidazole-tosylic acid, imidazole-formic acid, imidazole-acetic acid, etc for isolation of lignin and aqueous solution of imidazole-alkali for isolation of hemicellulose.

BACKGROUND OF THE INVENTION AND DESCRIPTION OF PRIOR ART

The direct burning of biomass credits lot of $CO_2$ into the atmosphere. Moreover, these biomasses are not used even as fodders, so they create environment related issues. Nevertheless, this huge biomass might be used for the production of second generation value added bio-fuels and bio-chemicals by an environment-friendly and economical process. Hence, the isolation of major bio-polymers is utmost important for advance synthesis of valuable products through chemical or biological reaction pathway.

In a future bio-economy, finding a suitable solvent for lignocellulosic biomass has become utmost important for generating renewable bio-chemicals and biofuels processing. Tremendous effort is currently being expended in the World, to find feasible pathways for the effective isolation of lipids, cellulose, hemicellulose and lignin from the agricultural residues. Conventional methods for biomass deconstruction into cellulose, hemicelluloses and lignin bio-products often require extreme conditions and expensive techniques (e.g. steam explosion, high temperatures, high pressure, addition of strong acids or bases or oxidizing chemicals) resulting in degradation and occurrence of undesired side reactions (e.g. the synthesis of furans). Moreover, new ionic liquid (ILs) technologies for large scale application still show limitations in terms of the recoverability and cost.

Mentioned herein below are some of the processes reported for the isolation of cellulose, hemicellulose and lignin along with their demerits.

In the literature reported on the isolation of cellulose from wood biomass, most of the processes use mineral acids (HCl, $H_2SO_4$, $HNO_3$) or $H_2O_2$ or dioxane-mineral acids for isolation of cellulose from wood biomass or agricultural residues (Behera et al., Renew Sustain Energ Rev 36, 2014, 91). But, these processes required high temperature and a high concentrated solution of these acids for the isolation of major biopolymers.

Few reports are also available on the isolation of cellulose and hemicellulose from wood biomass by using aqueous solution of oxalic acid, maleic acid, etc (Vom Stein et al., Green Chem 13, 2011, 1772; Lee and Jeffries, Bioresour Technol 102, 2011, 5884). However, these organic acids extraction need high temperature (100 to 150° C.) and high pressure (upto 20 bar) for isolation of cellulose and hemicellulose.

Some of the work also reported isolation of cellulose and hemicellulose from wood biomass or agricultural residues in concentrated alkali medium at very low temperature upto −25° C. (Li et al., Ind Crop Prod 32, 2010, 551; Isogai, Cellulose 5, 1998, 309). However, the solvent attained this low temperature at the expense of high energy input. This process requires several attempts for effective isolation of cellulose and hemicellulose from the biomass. Moreover, the original crystallinity of the isolated cellulose and hemicellulose has been reduced.

Isolation of cellulose, hemicellulose and lignin using very costly ionic liquids (ILs) viz. 1-ethyl-3-methyl imidazolium acetate, 1-ethyl-3-methyl imidazolium chloride, 1-butyl-3-methyl imidazolium chloride, etc is also reported (Wang et al., CN103088692, 2013). The preparation of these solvents requires extensive chemical synthesis and purification steps. Further, the ILs are only effective in their purest forms, which adds cost to the procedure.

Some preliminary work on the separation of lipids and waxes together as crude extract was reported as pre-treatment process (Sasmal et al., Biomass Bioenerg, 45, 2012, 212). However, the systematic work on isolation, purification and characterization of lipids from spent aromatic crops biomass is not reported so far. The above methods for isolation of cellulose from plant biomass have serious drawbacks as they require hazardous reagents and are energetically wasteful. The most serious problem being the significant damage that occurs to the cellulose or hemicellulose or lignin during the extraction process. Therefore, an environmentally benign method for isolation of cellulose, hemicellulose and lignin without sacrificing the structure/properties of these biopolymers is the need of the hour. Though the extraction processes involving ILs have some advantages, yet they could not be further scaled-up due to its expensive nature. Therefore, the inventors of the present invention realized that there exists a dire need to provide some new model solvent systems to surmount the problems associated with using the IL solvents alone.

It is known that cellulose is a bio-polymer of glucose unit and hemicellulose is a bio-polymer of $C_6$ and $C_5$ sugars. Therefore, a number of high value chemicals can be derived from these carbohydrate polymers including hexitols, pentitols, levulinic acid, hydroxymethylfurfural, succinic acid, etc. Similarly lignin is viewed as an important bio-renewable source of aromatic compounds including vanillin, isovanillin, eugenol, isoeugenol, etc. Therefore, the development of an integrated bio-refinery is only possible if the isolation of these major biopolymers is done without sacrificing the hemicellulose or lignin. Most of the known procedures either target hemicellulose or lignin along with cellulose and during the isolation step one of the biopolymers (hemicellulose or lignin) is partially or completely lost or isolated in its distorted form.

In the hitherto known processes, there is requirement of corrosive solvents for carrying out the reaction at high operating reaction temperature, leading to corrosion of the metal reactors. Another category of processes needed very low operating temperature and also required repeated exercise for effective isolation of cellulose and hemicellulose from the wood biomass or agricultural residues. In yet another kind of processes the solvent (ILs) used are very expensive; therefore the processes are limited for laboratory studies only and cannot be scaled up further for commercialization. Overall the prior art processes are operable only with intensive input of energy. The present invention overcomes the said limitations by using solvent systems comprising ionic liquids for the isolation of lignin and other valuable biopolymers from spent biomass.

OBJECTS OF THE INVENTION

The main object of the present invention is to provide an eco-benign process for the isolation of lipids, cellulose, hemicellulose and lignin from agricultural residues.

Another object of the present invention is to provide new solvent systems for the isolation of biopolymers from spent aromatic biomass.

Still another object of the present invention is to provide a process wherein the solvents are recovered after the reaction and used multiple times thereafter.

SUMMARY OF THE INVENTION

The present invention provides a process for the effective isolation of lipids, cellulose, hemicellulose and lignin from agricultural residues through an environment-friendly economical process. Lipids present on the surface of the biomass inhibit the percolation of water, acid, alkali, etc. into the biomass. Thus, it is very essential to separate the lipids and waxes from the biomass before the isolation of major bio-polymers. Further, the de-waxed biomass is used for isolation of cellulose, hemicellulose and lignin using new solvent systems. The isolation of major bio-polymers in their purest form is essential for cost-economic study of the bio-refinery process. In the present process, the separation of lipids, cellulose, hemicellulose and lignin is achieved in reasonable quantities through environment friendly solvent systems. Therefore, the process is green, economical with the advantage that it can be scaled-up to the next level for commercial application.

In the present work, the organic acidified imidazole solvents used dissolved certain components from lignin-containing biomass (e.g. lignin) at mild conditions, so that it prevented further degradation. Since other components in the lignin-containing biomass (e.g. holocellulose) are very sparingly soluble in organic acidified imidazole solvents, therefore holocellulose could be separated from the higher soluble components (e.g. lignin) in an energy-efficient way. Further, the hemicellulose is dissolved in imidazole-alkali (alkali concentration ~0.1 M) in water and then isolated as precipitate with alcohol.

The lignin-containing agricultural residues considered are rice straw, wheat straw, cotton pod along with spent aromatic biomass such as mentha, ocimum, citronella, lemongrass, palmarosa, etc. Generally, these biomasses contain lipids (1.0 to 1.5%), cellulose (35 to 40%), hemicellulose (25 to 35%) and lignin (10 to 20%). The cotton is physically separated from the cotton pod and only cotton is taken for this isolation work, which contains nearly 95% of cellulose along with few percentages of hemicellulose and lignin.

Imidazole has a high melting point (90° C.). But, the organic acidified imidazole solvent is a liquid at room temperature. This solvent is synthesized by simple reflux or stirring at laboratory conditions (85 to 95° C.) for 30 minutes to 1 hour. The main advantages associated with the solvent are (i) low viscosity at room temperature and (ii) there is no need of the solvent purification step for accomplishing the lignin isolation. Also, the solvent is separated from the lignin (solution form) and rest of the biomass (cellulose and hemicellulose) in an energy-efficient route without much degradation of bio-polymers. The dissolved lignin is separated from the remaining solids by using a liquid-solid separation such as filtration, sedimentation or centrifugation. Thereafter, lignin is re-generated from the solution as precipitate through dilution with water. The solvent itself can be recovered and then pre-concentrated for further use. Similarly, the hemicellulose is dissolved in a new solvent system (imidazole-alkali in water) and further it was recovered from the solvent through precipitation with alcohol.

The solvents, methods and systems according to embodiments of the invention have various advantages over prior technology or approaches, such as:

Imidazole solvent system is economical and renewable;

The organic acidified Imidazole solvent system dissolves the lignin selectively from a lignin-containing biomass, resulting in highly efficient lignin recovery (up to 90%) from lignin-containing biomass;

The recovered lignin is of higher quality with comparison to the recovered lignin in conventional, prior art processes and can be valorized instead of being burned;

The solvent system imidazole-alkali in water dissolves the hemicellulose, which is further recovered as precipitate with alcohol.

The recovered hemicellulose is of higher quality with comparison to the hemicellulose recovered in conventional, prior art processes and can be valorized;

The remaining cellulose is also of better quality (less degradation, longer fibers due to milder process conditions) as compared to the cellulose recovered through conventional processes;

Much less water is needed as compared to the conventional processes, which means that the energy requirement for the recovery process is tremendously reduced;

There is no need of pressurized conditions (process is operated in open vessel);

The lignin and hemicellulose are isolated at low temperature without stirring, therefore it reduces the energy consumption and only a simple reactor is required for carrying out the process;

The solvent systems are re-usable multiple times, so the process is economical and environment-friendly.

Since lignin acts as natural glue that binds cellulose and hemicellulose, therefore initially isolation of lignin is utmost important. The organic acidified imidazole solvent dissolves the lignin specifically leaving cellulose and hemicellulose in solid state. Taking advantage of this difference in the dissolution ability, first the lignin is selectively dissolved in organic acidified imidazole solvent and then recovered from the solution as precipitate with further dilution in water. Hemicellulose is less crystalline as compared to cellulose and that facilitates hemicellulose for making the solution with imidazole-alkali in water. Then hemicellulose is isolated from the solution as precipitate with alcohol. Finally, the portion which is insoluble in imidazole solvents is the cellulose. In the said environment-friendly integrated process, the isolation of lipids, cellulose, hemicellulose and lignin from agricultural residues with high percentage yields is achieved under mild reaction conditions.

In an embodiment, the process of the present invention can be used for various applications, such as selective lignin dissolution and extraction; selective hemicellulose dissolution and extraction; lignin and hemicellulose valorization; pulp and paper making; cardboard industry; cellulose hydrolysis (e.g. to fermentable sugars); making inedible crops edible (e.g. by removing lignin parts that cannot be digested by animals); production of pure cellulose from cotton; chemical or fuel production.

In another embodiment, the present invention provides a method for isolating lipids form agricultural residues (biomass) using either soxhlet extraction or stirred reactor process wherein the steps comprising:

(a) Pulverizing the dried biomass to size about 0.1 to 0.15 mm
(b) The biomass is extracted using (i) petroleum ether (60-80° C.) or hexane in the first step, and (ii) extracted with alcohol in second step.
(c) Neutral lipids are separated from the concentrated extract of first step (i) through precipitation with cold alcohol. The alcohol soluble portion is again partied with adding on the hexane/pentane and distilled water. The hexane or pentane soluble portion is concentrated to obtain the neutral lipids.
(d) The fatty acids identified in neutral lipids are palmitic (20 to 30%), oleic (8 to 11%), linoleic (18 to 22%), linolenic (6 to 8%), etc and thus the lipids are enriched with unsaturated fatty acids.
(e) Polar lipids are separated from the concentrated extract of second step (ii) through solvent-solvent extraction process using organic solvent ($CHCl_3$ or $CH_2Cl_2$ or ethyl acetate) and water. The organic solvent (ethyl acetate or $CHCl_3$ or $CH_2Cl_2$) soluble portion is concentrated to obtain the polar lipids.
(f) Polar lipids are identified as glyco-lipids and phospho-lipids.

In another embodiment, the present invention provides a method for the synthesis of new solvent system imidazole-tosylic acid or imidazole-formic acid or imidazole-acetic acid from 'imidazole' wherein the steps comprise:

(i) Equimolar ratios of imidazole with organic acid (formic acid, acetic acid, tosylic acid, tosylic acid monohydrate, propionic acid, etc) are taken in water for preparing new solvent system. The aqueous reaction mixture is refluxed or stirrer at 85 to 95° C. for 30 minutes to 1 h for getting the organic acidified imidazole solvent system.
(ii) The organic acidified imidazole solvent system is used as prepared without further purification.

In still another embodiment, the present invention provides a method to isolate lignin from de-waxed biomass which was treated with imidazole-tosylic acid or imidazole-formic acid or imidazole-acetic acid as per the following steps:

(I) The de-waxed biomass was treated with imidazole-tosylic acid or imidazole-formic acid or imidazole-acetic acid at 80 to 100° C. for 30 minutes to 2 hours without stirring to carry out the lignin into the solution state.
(II) The lignin was separated out from the solution as precipitate following dilution with water.
(III) Filtered or centrifuged the reaction mixture to isolate the lignin present in the aqueous solution. Washed the residue with water to obtain the pure lignin.
(IV) The spent imidazole solvent obtained in step 3 was charcoaled and pre-concentrated to obtain nearly 90% of recovered solvent. This recovered solvent was re-used at least five times with similar efficiency.

In yet another embodiment, the present invention provides a method for Isolation of cellulose and hemicellulose from the de-lignified biomass using imidazole-alkali in water solution as per the following steps:

(A) The de-lignified biomass was treated with solution of imidazole (0.1M, approx)-alkali (0.1M, approx) in water at 60 to 90° C. for 30 minutes to 2 hours without stirring to bring out the hemicellulose into the solution state. The common alkali used were NaOH, KOH, $Ca(OH)_2$, $K_2CO_3$, $Na_2CO_3$, $NaHCO_3$, $KHCO_3$, $NH_4OH$, etc.
(B) Filtered the solution and filtrate was neutralized with formic acid or acetic acid or tosylic acid. Further hemicellulose was isolated from the solution as precipitate following charging with alcohols.
(C) Filtered or centrifuged the reaction mixture to isolate the hemicellulose present in the solution. Further, the residue was washed with alcohol to obtain the pure hemicellulose.
(D) The remaining solid was washed with water to obtain the pure cellulose.
(E) The spent imidazole solvent obtained in step 2 was charcoaled and concentrated to obtain nearly 90% of recovered solvent. The pH of this recovered solvent was maintained with fresh alkali and then re-used at least five times with similar efficiency.

In still another embodiment, the present invention provides re-use of imidazole solvent system for subsequent reactions.

In yet another embodiment, the present invention provides a process wherein the imidazole solvent system obtained after extraction of lignin is charcoaled and concentrated to obtain the recovered solvent which is re-used at least 5 times for subsequent reactions.

In yet another embodiment, the present invention provides a process wherein the imidazole solvent system obtained after extraction of hemicellulose and cellulose is charcoaled and concentrated to obtain the recovered solvent, the pH of which is maintained with fresh alkali and is re-used at least 5 times for subsequent reactions.

In yet another embodiment, the present invention provides an eco-friendly process for the isolation of biopolymers from agricultural residues, wherein the process comprises the steps: (A) obtaining and pulverizing dried biomass to size in the range of 0.1 to 0.15 mm and extracting using petroleum ether (60-80 degree C.) or hexane in the first phase and alcohol in the second phase to obtain de-waxed biomass extract; (B) portioning the biomass extract with hexane water to obtain a hexane soluble portion and raffinate portion; (C) treating the hexane soluble portion with fuller's earth to obtain a filtrate, followed by filtration and concentration of filtrate to obtain neutral lipids; (D) extracting the raffinate portion with alcohol to obtain an extract, which is subsequently concentrated and solubilized with aqueous alcohol followed by portioning with ethyl acetate to obtain an ethyl acetate soluble portion, and an ethyl acetate insoluble portion; (E) treating the ethyl acetate soluble portion with fuller's earth to obtain a filtrate, followed by filtration and concentration of filtrate to obtain polar lipids; (F) preparing a new solvent system by mixing imidazole with organic acid in equimolar ratio in water followed by refluxing or stirring at a temperature in the range of 85 to 95 degree C. for a period of 30 minutes to 1 hour to obtain an organic acidified imidazole solvent system; (G) treating the ethyl acetate insoluble portion as obtained in step [d] with the organic acidified imidazole solvent system as obtained in step [f] at a temperature in the range of 80 to 100 degree C. for a period of 30 minutes to 2 hours without stirring to obtain a de-lignified biomass and to bring out the lignin into the solution state; (H) precipitating the lignin from the solution as obtained in step [g] by dilution with water and filtering or centrifuging and washing the precipitate to isolate pure lignin; (I) treating the de-lignified biomass as obtained in step [g] with solution of 0.1M imidazole and 0.1M alkali in water at a temperature in the range of 60 to 90 degree C. for a period of 30 minutes to 2 hours without stirring followed by filtering the solution to obtain the hemicellulose in filtrate and cellulose in the residue; (J) neutralizing the filtrate as obtained in step [i] with organic acid followed by addition of alcohols to precipitate the hemicellulose followed by filtration or centrifugation of the mixture and washing the precipitate with alcohol to obtain pure hemicellulose; and (K) washing the residue as obtained in step [i] with water to obtain the pure cellulose.

DETAILED DESCRIPTION OF THE INVENTION

The details of the biological materials used for the purposes of the present invention and complete information as to where from they were procured is provided here as under:

| Biological resource (Common name) | Botanical name | Source of procurement |
|---|---|---|
| Mentha biomass | Mentha arvensis | CSIR-CIMAP research farm, Lucknow, Uttar Pradesh |
| Ocimum biomass | Ocimum basilicum | CSIR-CIMAP research farm, Lucknow, Uttar Pradesh |
| Citronella biomass | Cymbopogon winterianus | CSIR-CIMAP research farm, Lucknow, Uttar Pradesh |
| Lemongrass biomass | Cymbopogon flexuosus | CSIR-CIMAP research farm, Lucknow, Uttar Pradesh |
| Palmarosa biomass | Cymbopogon martinii | CSIR-CIMAP research farm, Lucknow, Uttar Pradesh |
| Wheat straw | Triticum sp. | CSIR-CIMAP research farm, Lucknow, Uttar Pradesh |
| Rice straw | Oryza sativa | Mr. Bhoomi Dhar Village-Dophra Post-Kanaila Dist-Basti Uttar Pradesh-272301 |
| Cotton pod | Gossypium sp. | CSIR-NBRI research farm, Lucknow, Uttar Pradesh |
| Cotton (commercially obtained) | Gossypium sp. | Suntech Medical Systems Ltd, Amausi Industrial Area, Lucknow, Uttar Pradesh Ph: 0522-4022167 |

It is known that lipids along with major bio-polymers are used for the production of bio-fuels and bio-chemicals. Therefore, the present work has been carried out and there is developed a suitable eco-friendly process for isolation of lipids, cellulose, hemicellulose and lignin from agricultural residues. The chemicals used for the process are imidazole, p-toluene sulfonic acid, p-toluene sulfonic acid monohydrate, formic acid, acetic acid, propionic acid, alkali (NaOH, KOH, $NH_4OH$, $Ca(OH)_2$, $K_2CO_3$, $Na_2CO_3$, $NaHCO_3$, $KHCO_3$), fuller's earth and general organic solvents, which are very cheap and easily available. The used chemicals have less harmful environmental impacts as compared to the concentrated mineral acids and alkali. Therefore, the complete process is based on the greener approach with efficient and rational recovery percentages of all major bio-polymers including the lipids from non-food agricultural substrates.

The agricultural residues (wheat straw, rice straw and cotton pod) including the aromatic biomasses such as mentha, ocimum, citronella, lemongrass, pamarosa were collected after extraction of the essential oil. These biomasses were sun-dried and then pulverized to a particle size of 1 mm (approx). These pulverized biomasses were then kept for further chemical pre-treatment.

(i) Synthesis of Imidazole-Tosylic Acid or Imidazole-Formic Acid or Imidazole-Acetic Acid Imidazole is a solid at room temperature (M.P 90° C.), therefore first prepared its solution with water in 1:1 weight ratio. Thereafter, equimolar ratio of tosylic acid or tosylic acid monohydrate or formic acid or acetic acid (1:1=acid: imidazole) in water was slowly added with it. Reaction mixture was refluxed or stirred at 85 to 95° C. for 30 minutes to 1 h to obtain imidazole-tosylic acid or imidazole-formic acid or imidazole-acetic acid, which was used directly without further purification.

(ii) Isolation of Lipids from the Biomasses

The pulverized biomass was first extracted in a Soxhlet apparatus or stirred reactor at 60 to 65° C. for 2 to 3 h with petroleum ether or hexane. The solvent was removed under vacuo at 40° C. for getting the extract. The extract was charged with chilled alcohol to precipitate the waxes, filtered and concentrated the alcohol extract. Again portioned the extract in hexane or pentane with water, and hexane or pentane soluble portion was treated with fuller's earth. Then, filtered and concentrated the hexane or pentane solution to obtain the neutral lipids. The remaining biomass was again extracted in a Soxhlet apparatus or stirred reactor for 2 to 3 h with alcohol. The solvent was removed under vacuo at 45° C. for getting the extract of polar compounds. Further, the extract was followed by solvent-solvent separation process ($CHCl_3$ or $CH_2Cl_2$ or ethyl acetate along with water), and polar lipids were isolated as $CHCl_3$ or $CH_2Cl_2$ or ethyl acetate soluble portion of the extract. Finally the lipids solution was passed through fuller's earth to remove the unwanted chlorophyll pigments. Then, filtered and concentrated to obtain the polar lipids.

(iii) Isolation of Lignin

The de-waxed biomass was treated with imidazole-tosylic acid, imidazole-formic acid or imidazole-acetic acid solution (1:5 to 1:8) at 80 to 100° C. for 1 h without stirring. The solution was filtered and filtrate contained the lignin in the solution state. Then lignin was recovered from the solution as precipitate, following further dilution in water. Precipitate was recovered by filtration or centrifugation and isolated the lignin (upto 85% recovery).

(iv) Isolation of Cellulose and Hemicellulose

The de-lignified biomass was treated with imidazole (0.1M)-alkali (0.1M) solution in water at 60 to 90° C. for 1 h with de-lignified biomass to solvent ratio of 1:5 to 1:8. The common alkali used in the experiments were NaOH, KOH, $Na_2CO_3$, $K_2CO_3$, $NaHCO_3$, $KHCO_3$, $Ca(OH)_2$, $NH_4OH$, etc. Then, filtered the solution and neutralised the filtrate using formic acid or acetic acid or tosylic acid. The hemicellulose was isolated from the neutral filtrate through precipitation with alcohol. Hemicellulose was recovered by filtration or centrifugation followed by washing with alcohol. The remaining insoluble solid was washed with water and dried to obtain the pure cellulose. The isolated yields of cellulose and hemicellulose were upto 90%.

Figure 1:
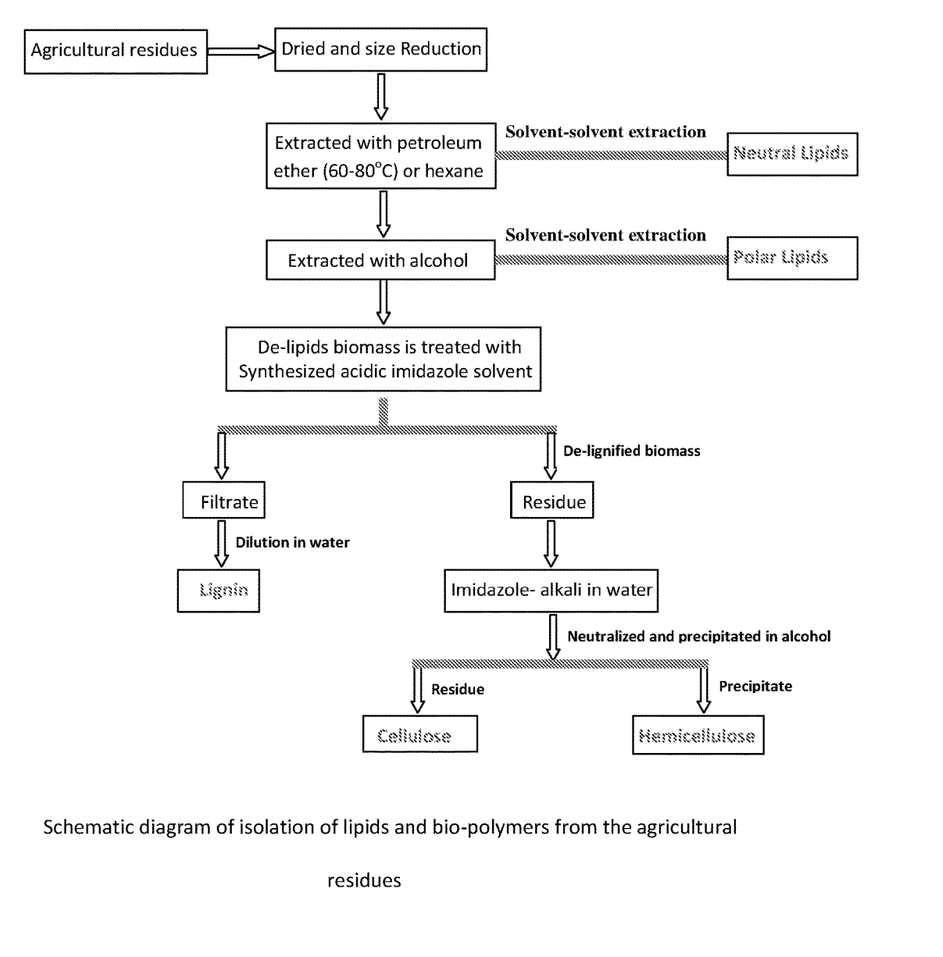
FIG. 1 illustrates the major steps involved in the isolation of biopolymers from agricultural residues.

The complete flow chart for the isolation of lipids and major bio-polymers from spent aromatic biomass is presented in FIG. 1 of the drawings accompanying the specification.

EXAMPLES

The following examples are given by way of illustration and therefore should not be constructed to limit the scope of the present invention.

Example 1

Air dried and pulverized spent mentha biomass (50 g) was extracted with 220 mL of hexane in a Soxhlet apparatus for 3 h. The solution was concentrated under vacuum and weight of the extract was 1.2 g (2.4%). The extract was charged with chilled methanol to precipitate the waxes. It was filtered and the methanol extract was concentrated. Again portioned the extract with hexane-water and hexane soluble portion was treated with 0.2 g of fuller's earth. Finally, filtered and concentrated the filtrate to obtain the neutral lipids (0.35 g, 0.7%). The raffinate biomass was again extracted with methanol (200 mL) in a Soxhlet apparatus for 3 h. The solution was concentrated under vacuum and weight of the extract was 2 g (4%). It was solubilised with aqueous alcohol and concentrated and then portioned with ethyl acetate. Further, ethyl acetate soluble portion was treated with 0.1 g of fuller's earth, then filtered and concentrated to obtain the polar lipids (0.15 g, 0.3%). After drying, the weight of the de-waxed biomass was 45 g. The de-wax biomass (8 g) was treated with 50 g imidazole-tosylic acid and kept at 100° C. for 1 h without stirring. Cooled the reaction mixture and filtered using ethanol. Concentrated the filtrate to remove the ethanol and further added 50 mL of water in concentrated extract to precipitate the lignin. The lignin (precipitate) was recovered by centrifugation and washed the residue in distilled water. The yield of lignin was 1.3 g (16%). The de-lignified biomass was treated with about 50 mL imidazole (0.1 M)-KOH (0.09 N) in water and kept at 65° C. for 45 min. Filtered the solution and filtrate was neutralized (pH: 5.5) with acetic acid and precipitated the hemicellulose with 100 mL of ethanol. Hemicellulose (2.4 g, 30%) was recovered by centrifugation followed by washing with ethanol and oven dried. The remaining solid was cellulose (3.0 g, 37.5%) obtained after washing with distilled water and oven dried.

Example 2

Air dried and pulverized spent Ocimum biomass (50 g) was extracted with 200 mL of petroleum ether (60-80° C.) in a Soxhlet apparatus for 4 h. The solution was concentrated under vacuum and weight of the extract was 1.3 g (2.6%). The extract was charged with chilled ethanol to precipitate the waxes. Filtered it and concentrated the ethanol extract. Again portioned the extract with hexane-water and hexane soluble portion was treated with 0.2 g of fuller's earth. Then filtered and concentrated to obtain the neutral lipids (0.4 g, 0.8%). The raffinate biomass was again extracted with ethanol (200 mL) for 3 h. The solution was concentrated under vacuum and weight of the extract was 2.2 g (4.4%). It was solubilised with aqueous alcohol, then concentrated the aqueous extract and portioned with chloroform. Further, chloroform soluble portion was treated with 0.1 g of fuller's earth, then filtered and concentrated to obtain the polar lipids (0.13 g, 0.26%). After drying, the weight of the de-waxed biomass was 44 g. The de-wax biomass (5 g) was treated with 30 g imidazole-formic acid and kept at 100° C. for 1 h without stirring. Cooled the reaction mixture and filtered using methanol. Concentrated the filtrate to remove the methanol and further added 25 mL of water in concentrated extract to precipitate the lignin. The lignin (precipitate) was recovered by centrifugation and washed the residue with distilled water. The yield of lignin was 0.9 g (18%). The de-lignified biomass was treated with 25 mL imidazole (0.1M)-$K_2CO_3$ (0.9 M) in water and kept at 80° C. for 1 h. Filtered the solution and filtrate was neutralized (pH: 5.0) with formic acid and precipitated with 50 mL of methanol. Hemicellulose (1.25 g, 25%) was recovered by filtration followed by washing with ethanol and oven dried. The remaining solid was cellulose (2.0 g, 40%) obtained after washing with distilled water and oven dried.

Example 3

Air dried and pulverized spent citronella biomass (50 g) was extracted with 250 mL of petroleum ether (60-80° C.) in a reflux stirrer reactor for 4 h. The solution was concentrated under vacuum and weight of the extract was 1.25 g (2.5%). The extract was charged with chilled methanol to precipitate the waxes. Filtered it and concentrated the methanol extract. Again portioned the extract with petroleum ether-water and petroleum ether soluble portion was treated with 0.2 g of fuller's earth. Then filtered and concentrated to obtain the neutral lipids (0.4 g, 0.8%). The raffinate biomass was again extracted with ethanol (220 mL) for 4 h. The solution was concentrated under vacuum and weight of the extract was 2.3 g (4.6%). It was solubilised with aqueous alcohol, then concentrated the aqueous extract and portioned with dichloromethane. Further, dichloromethane soluble portion was treated with 0.1 g of fuller's earth, then filtered and concentrated to obtain the polar lipids (0.17 g, 0.34%). After drying, the weight of the de-waxed biomass was 45 g. The de-wax biomass (5 g) was treated with 30 g imidazole-acetic acid and kept at 90° C. for 90 min without stirring. Cooled the reaction mixture and filtered using ethanol. Concentrated the filtrate to remove the ethanol and further added 30 mL of water in the concentrated extract to precipitate the lignin. The lignin (precipitate) was recovered by filtration and washed the residue with distilled water. The yield of lignin was 0.7 g (14%). The de-lignified biomass was treated with 25 mL imidazole (0.1M)-$Ca(OH)_2$ (0.1M) in water and kept at 80° C. for 1 h. Filtered the solution and filtrate was neutralized with formic acid (pH: 5.3) and precipitated with 50 mL of methanol. Hemicellulose (1.5 g, 30%) was recovered by centrifugation followed by washing with ethanol and oven dried. The remaining solid was cellulose (1.95 g, 39%) obtained after washing with distilled water and oven dried.

Example 4

Air dried and pulverized spent palmarosa biomass (50 g) was extracted with 240 mL of hexane in a reflux stirrer reactor for 4 h. The solution was concentrated under vacuum and weight of the extract was 1.2 g (2.4%). The extract was charged with chilled methanol to precipitate the waxes. Filtered it and concentrated the methanol extract. Again portioned the extract with pentane-water and pentane soluble portion was treated with 0.2 g of fuller's earth. Then filtered and concentrated to obtain the neutral lipids (0.4 g, 0.8%). The raffinate biomass was again extracted with ethanol (210 mL) for 3 h. The solution was concentrated under vacuum and weight of the extract was 2.3 g (4.6%). It was solubilised with aqueous alcohol, then concentrated the aqueous extract and portioned with $CH_2Cl_2$. Further, $CH_2Cl_2$ soluble portion was treated with 0.1 g of fuller's earth, then filtered and concentrated to obtain the polar lipids (0.11 g, 0.22%). After drying, the weight of the de-waxed biomass was 44 g. The de-waxed biomass (5 g) was treated with 25 g imidazole-formic acid and kept at 95° C. for 1 h without stirring. Cooled the reaction mixture and filtered using methanol. Concentrated the filtrate to remove the methanol and further added 25 mL of water in the concentrated extract to precipitate the lignin. The lignin (precipitate) was recovered by filtration and washed the residue with distilled water. The yield of lignin was 0.75 g (15%). The de-lignified biomass was treated with 25 mL imidazole (0.1M)-urea (0.1M)-$KHCO_3$ (0.3M) in water and kept at 75° C. for 1 h. Filtered the solution and filtrate was neutralized (pH: 5.4) with formic acid and precipitated with 50 mL of ethanol. Hemicellulose (1.6 g, 30%) was recovered by centrifugation followed by washing with ethanol and oven dried. The remaining solid was cellulose (2.1 g, 42%) obtained after washing with distilled water and oven dried.

Example 5

Air dried and pulverized wheat straw (50 g) was extracted with 250 mL of petroleum ether (60-80° C.) in a reflux stirrer reactor for 4 h. The solution was concentrated under vacuum and weight of the extract was 0.5 g (1%). The extract was charged with chilled methanol to precipitate the waxes. Filtered it and concentrated the methanol extract. Again portioned the extract with petroleum ether-water and petroleum ether soluble portion was treated with 0.25 g of fuller's earth. Then filtered and concentrated to obtain the neutral lipids (0.35 g, 0.7%). The raffinate biomass was again extracted with ethanol (210 mL) for 3 h. The solution was concentrated under vacuum and weight of the extract was 2.3 g (4.6%). It was solubilised with aqueous alcohol, then concentrated the aqueous extract and portioned with ethyl acetate. Further, ethyl acetate soluble was treated with 0.2 g of fuller's earth, then filtered and concentrated to obtain the polar lipids (0.2 g, 0.4%). After drying, the weight of the de-waxed biomass was 45 g. The de-waxed biomass (5 g) was treated with 35 g imidazole-tosylic acid and kept at 90° C. for 1 h without stirring. Cooled the reaction mixture and filtered using ethanol. Concentrated the filtrate to remove the ethanol and further added 30 mL of water in concentrated extract to precipitate the lignin. The lignin (precipitate) was recovered by filtration and washed the residue with distilled water. The yield of lignin was 0.9 g (18%). The de-lignified biomass was treated with about 30 mL imidazole (0.1M)-urea (0.1M)-$Na_2CO_3$ (0.1M) in water and kept at 80° C. for 45 min. Filtered the solution and filtrate was neutralized (pH: 5.5) with acetic acid and precipitated with 50 mL of ethanol. Hemicellulose (1.3 g, 26%) was recovered by centrifugation followed by washing with methanol and oven dried. The remaining solid was cellulose (1.9 g, 38%) obtained after washing with distilled water and oven dried.

Example 6

Air dried and pulverized mentha biomass (50 g) was extracted with 250 mL of hexane in a reflux stirrer reactor for 4 h. The solution was concentrated under vacuum and weight of the extract was 1.25 g (2.5%). The extract was charged with chilled ethanol to precipitate the waxes. Filtered it and concentrated the ethanol extract. Again portioned the extract with petroleum ether-water and petroleum ether soluble portion was treated with 0.25 g of fuller's earth. Then filtered and concentrated to obtain the neutral lipids (0.37 g, 0.7.4%). The raffinate biomass was again extracted with ethanol (210 mL) for 3 h. The solution was concentrated under vacuum and weight of the extract was 2.1 g (4.2%). It was solubilised with aqueous alcohol, then concentrated the aqueous extract and portioned with chloroform. Further, chloroform soluble was treated with 0.15 g of fuller's earth, then filtered and concentrated to obtain the polar lipids (0.17 g, 0.34%). After drying, the weight of the de-waxed biomass was 44 g. The de-waxed biomass (5 g) was treated with 35 g imidazole-formic acid and kept at 95° C. for 1 h without stirring. Cooled the reaction mixture and filtered using methanol. Concentrated the filtrate to remove the methanol and further added 30 mL of water in concentrated extract to precipitate the lignin. The lignin (precipitate) was recovered by filtration and washed the residue with distilled water. The yield of lignin was 0.75 g (15%). The de-lignified biomass was treated with about 30 mL imidazole (0.1M)-$NH_4OH$ (0.1M) in water and kept at 70° C. for 45 min. Filtered the solution and filtrate was neutralized (pH: 5.5) with acetic acid and precipitated with 50 mL of ethanol. Hemicellulose (1.4 g, 28%) was recovered by centrifugation followed by washing with methanol and oven dried. The remaining solid was cellulose (1.9 g, 38%) obtained after washing with distilled water and oven dried.

Example 7

Air dried and pulverized rice straw biomass (50 g) was extracted with 250 mL of petroleum ether (60-80° C.) in a reflux stirrer reactor for 3 h. The solution was concentrated under vacuum and weight of the extract was 0.8 g (1.6%). The extract was charged with chilled ethanol to precipitate the waxes. Filtered it and concentrated the ethanol extract. Again portioned the extract with pentane-water and pentane soluble portion was treated with 0.3 g of fuller's earth. Then, filtered and concentrated to obtain the neutral lipids (0.35 g, 0.7%). The raffinate biomass was again extracted with ethanol (220 mL) for 3 h. The solution was concentrated under vacuum and weight of the extract was 2.3 g (4.6%). It was solubilised with aqueous alcohol, then concentrated the aqueous extract and portioned with ethyl acetate. Further, ethyl acetate soluble was treated with 0.2 g of fuller's earth, then filtered and concentrated to obtain the polar lipids (0.21 g, 0.41%). After drying, the weight of the de-waxed biomass was 45 g. The de-waxed biomass (5 g) was treated with 30 g imidazole-tosylic acid and kept at 85° C. for 90 min without stirring. Cooled the reaction mixture and filtered using methanol. Concentrated the filtrate to remove the methanol and further added 20 mL of water in the concentrated extract to precipitate the lignin. The lignin (precipitate) was recovered by filtration and washed the residue with distilled water. The yield of lignin was 0.85 g (17%). The de-lignified biomass was treated with 20 mL imidazole (0.1M)-urea (0.1M)-$NaHCO_3$ (0.5N) in water and kept at 90° C. for 30 minutes. Filtered the solution and filtrate was neutralized with formic acid (pH: 5.1) and precipitated with 50 mL of ethanol. Hemicellulose (1.5 g, 30%) was recovered by filtration followed by washing with ethanol and then dried in oven. The remaining solid was cellulose (1.9 g, 38%) obtained after washing with distilled water which was then dried in oven.

Example 8

The imidazole-tosylic acid solution recovered from Example 6 was charcoaled and pre-concentrated to 26 g to 28 g of imidazole-tosylic acid. The de-waxed mentha biomass (5 g) was treated with recovered solution and kept at 95° C. for 1 h without stirring. Cooled the reaction mixture and filtered using methanol. Concentrated the filtrate to remove the methanol and further added 20 mL of water in concentrated extract to precipitate the lignin. The lignin (precipitate) was recovered by centrifugation and washed the residue with distilled water. The yield of lignin was 0.8 g (16%). The de-lignified biomass was treated with 30 mL of imidazole (0.1M)-NaOH (0.1N) solution and kept at 75° C. for 1 h. Filtered the solution and filtrate was neutralized (pH: 5.2) with tosylic acid and then precipitated with 50 mL ethanol. Hemicellulose (1.5 g, 30%) was recovered by centrifugation followed by washing with methanol and then dried in oven. The remaining solid was cellulose (2.0 g, 40%) obtained after washing with distilled water which was dried in oven.

Example 9

The imidazole-aqueous NaOH solution recovered from Example 7 was concentrated by removing the ethanol through vacuum distillation. Then aqueous solution was charcoaled to obtain 28 g of imidazole-NaOH aqueous solution. It was treated with 0.05N NaOH solution to regenerate the solvent system (imidazole-NaOH). The de-lignified mentha biomass (5 g) was treated with this solvent system and kept at 85° C. for 1 h. Filtered the solution and filtrate was neutralized (pH: 5.0) with formic acid and then precipitated with 50 mL of ethanol. Hemicellulose (1.9 g, 38%) was recovered by filtration followed by washing with distilled water and oven dried. The remaining solid was cellulose (2.8 g, 56%) obtained after washing with distilled water and oven dried.

Example 10

Air dried and pulverized cotton (15 g) collected from cotton pod was extracted with 200 mL of hexane in a Soxhlet apparatus for 3 h. The solution was concentrated under vacuum and weight of the extract was 0.04 g (0.25%). The raffinate cotton was again extracted with ethanol (200 mL) for 3 h. The solution was concentrated under vacuum and weight of the extract was 0.05 g (0.3%). After following all the steps, it was observed that cotton did not contain any lipids. The dried cotton weight was 14.5 g. The cotton (4 g) was treated with 30 g imidazole tosylic acid and kept at 85° C. for 2 h without stirring. Cooled the reaction mixture and filtered using methanol. Concentrated the filtrate to remove the methanol and further added 30 mL of water in concentrated extract to precipitate the lignin. The lignin (precipitate) was recovered by centrifugation and washed the residue with distilled water. The yield of lignin was 0.05 g (1.2%). The de-lignified cotton was treated with 25 mL imidazole (0.1M)-urea (0.1M)-NaOH (0.1N) in water and kept at 70° C. for 1 h. Filtered the solution and filtrate was neutralized (pH; 4.8) with formic acid and precipitated with 50 mL of ethanol. The precipitate (hemicellulose) was 0.08 g (2%). The remaining solid was cellulose (3.75 g, 93.7%) obtained after washing with distilled water which was then dried in oven.

Example 11

The pure laboratory grade cotton (4 g) was treated with 32 g imidazole tosylic acid and kept at 85° C. for 90 without stirring. Cooled the reaction mixture and filtered using methanol. Concentrated the filtrate to remove the methanol and further added 30 mL of water in concentrated extract to precipitate the lignin. The lignin (precipitate) was recovered by centrifugation and washed the residue with distilled water. The yield of lignin was 0.01 g (0.25%). The de-lignified biomass was treated with 20 mL imidazole (0.1M)-urea (0.1M)-NaOH (0.1N) in water and kept at 70° C. for 2 h. Filtered the solution and filtrate was neutralized (pH: 4.8) with tosylic acid and precipitated with 50 mL of ethanol. The precipitate was not obtained. The remaining solid was cellulose (4.9 g, 98%) obtained after washing with distilled water which was then dried in oven.

Example 12

The preparation of imidazole based solvent system was done as per the above mentioned examples. Lignin (96%, alkali lignin, low sulfonate content, Sigma-Aldrich), neutral lignin (TCI chemical), cellulose (microcrystalline cellulose, Sigma-Aldrich), and crude cellulose isolated from cotton in the laboratory were used for the reaction. In two separate experimental set-ups, one set was treated with lignin and another set was treated with cellulose. Similar experiments were carried out by taking lignin and cellulose instead of biomass. The lignin was treated with organic acidified imidazole solvent for isolating the lignin in solution and then recovered the lignin as precipitate through dilution with water resulting in more than 95% of isolated lignin. On the other hand, cellulose does not participate in the reaction and it was recovered in more than 95% amounts after following the extraction of biomass with firstly organic acidified imidazole solvent and secondly with imidazole-alkali in water. Thus, the prepared acidified imidazole solvent selectively isolated the lignin into the solution stage and then lignin was released as precipitate by further dilution with water. Similarly, imidazole-alkali in water solvent selectively isolated the hemicellulose from the de-lignified biomass and further hemicellulose was recovered through precipitation with alcohol. The purity of the isolated cellulose, hemicellulose and lignin was determined by FT-IR, XRD, TGA and chromatographic analysis. The results indicated that the purity of the bio-polymers was more than 95%. To validate the finding, the reaction for synthesis of furan derivatives from cellulose and hemicellulose using standard ionic liquid and catalysts (Sigma-Aldrich) were carried out. It is well known that ILs are very efficient solvents to dissolve both cellulose and hemicellulose. The hydrolysis of isolated cellulose in ILs solvent with catalyst produced more than 90% hydroxymethylfurfural (HMF) along with 2-3% furfural. Similarly, the analysis of reaction products from hemicellulose furnished around 90% furfural with 5-6% HMF. It is already known that hemicellulose contained the C5 sugar moieties with few percentages of C6 sugar moieties in its structure. Therefore, C5 sugar is converted to furfural, whereas the C6 sugar produces HMF.

Advantages of the Invention

Isolation of lipids from the agricultural residues is a major advantage as the lipids are generally extracted from oil-seed crops.
The composition of neutral lipids closely matched with the seed oils, and it contained 45% of essential unsaturated fatty acids.
The polar lipids (glyco-lipids and phospho-lipids) were also isolated from the spent biomasses.

Novel solvent systems (i.e. imidazole-tosylic acid, imidazole-formic acid, imidazole-acetic acid) were synthesized by simple procedure using very economical and easily available chemical i.e imidazole. Further, Imidazole is a solid at room temperature whereas, the derived solvents (imidazole-tosylic acid of imidazole-formic acid or imidazole-acetic acid) are liquid at room temperature.

Lignin was easily recovered from the solution through dilution with water. Further, the pre-concentrated organic based imidazole solvents were re-used for another batch of reaction.

Hemicellulose was separated from de-lignified biomass using new solvent system (imidazole-alkali) in water with very low concentration of alkali.

Hemicellulose was recovered from the solution by precipitation with alcohol. The imidazole based solvents were re-used for another batch of reaction by adjusting the pH of the solution.

Cellulose was very sparingly soluble in both the solvent system, therefore it was easily isolated as fine solid particles.

The isolation (extraction efficiency) of cellulose, hemicellulose and lignin was more than 80% from de-lipidated biomass.

In the present work, the lipids, cellulose, hemicellulose and lignin were isolated from waste biomass by economical and environment-friendly chemical process. After obtaining these major bio-polymers, it is very much easy to convert these cellulose, hemicellulose and lignin to various other valuable bio-products.

We claim:

1. A process for the isolation of biopolymers from agricultural residues, wherein the process comprises the steps:
   a) obtaining and pulverizing dried biomass to size in the range of 0.1 to 0.15 mm and extracting using petroleum ether (60-80 degree C.) or hexane in a first phase and one or more alcohol in a second phase to obtain a de-waxed biomass extract;
   b) partitioning the de-waxed biomass extract with water to obtain a nonpolar soluble portion and a raffinate portion;
   c) treating the nonpolar soluble portion with fuller's earth followed by filtration and concentration of filtrate to obtain neutral lipids;
   d) the raffinate portion is subsequently concentrated and solubilized with aqueous alcohol followed by partition with one or more organic solvent to obtain an organic solvent soluble portion, and an aqueous portion;
   e) treating the organic solvent soluble portion with fuller's earth followed by filtration and concentration of filtrate to obtain polar lipids;
   f) mixing imidazole with one or more organic acid in equimolar ratio in alcohol followed by refluxing or stirring at a temperature in the range of 65 to 90 degree C. for a period of 30 minutes to 1 hour to obtain an organic acidified imidazole:water (2:1 to 1:1) solvent system after removing the alcohol and adding water content;
   g) treating the aqueous portion as obtained in step [d] with the organic acidified imidazole:water (2:1 to 1:1) solvent system as obtained in step [f] at a temperature in the range of 90 to 120 degree C. for a period of 30 minutes to 2 hours without stirring to obtain a de-lignified biomass and a solution containing lignin;
   h) precipitating lignin from the solution as obtained in step [g] by dilution with water and filtering or centrifuging and washing the precipitate to isolate pure lignin;
   i) mixing 0.1 M of imidazole solution with 0.1 M of one or more alkali in water followed by refluxing or stirring at a temperature in the range of 90 to 110 degree C. for a period of 30 minutes to 1 hour to obtain a solvent system of 0.1M to 0.2M imidazole-alkali in water;
   j) treating the de-lignified biomass as obtained in step [g] with the solvent system as obtained in step [i] at a temperature in the range of 60 to 90 degree C. for a period of 30 minutes to 2 hours without stirring followed by filtering to obtain a filtrate containing hemicellulose and a residue containing cellulose;
   k) neutralizing the filtrate as obtained in step [j] with one or more organic acid followed by addition of one or more alcohols to precipitate the hemicellulose followed by filtration or centrifugation and washing the precipitate with alcohol to obtain pure hemicellulose;
   l) washing the residue as obtained in step [j] with water to obtain the pure cellulose.

2. The process as claimed in claim 1, wherein the alcohols used are selected from the group consisting of methanol, and ethanol, and solvent used in the extraction process is selected from the group consisting of hexane, pentane, and water.

3. The process as claimed in claim 1, wherein the organic solvent used is selected from the group consisting of $CHCl_3$, $CH_2Cl_2$, and ethyl acetate.

4. The process as claimed in claim 1, wherein in step [f], the organic acid used is selected from the group consisting of formic acid, acetic acid, tosylic acid, tosylic acid monohydrate, benzoic acid, and propionic acid.

5. The process as claimed in claim 1, wherein in step [i], the alkali used are selected from the group consisting of NaOH, KOH, $Ca(OH)_2$, $K_2CO_3$, $Na_2CO_3$, $NaHCO_3$, $KHCO_3$, and $NH_4OH$.

6. The process as claimed in claim 1, wherein in step [k], the organic acid used are selected from the group consisting of formic acid, acetic acid, and tosylic acid, and alcohols used in step [k] are selected from the group consisting of methanol, and ethanol.

7. The process as claimed in claim 1, wherein in step [c], the neutral lipids comprise palmitic acid (20 to 30%), oleic acid (8 to 11%), linoleic acid (18 to 22%), and linolenic acid (6 to 8%).

8. The process as claimed in claim 1, wherein the imidazole solvent system obtained in step [h] is charcoaled and concentrated to obtain a recovered solvent which is re-used at least 5 times for subsequent reactions.

9. The process as claimed in claim 1, wherein the imidazole solvent system obtained after step [k] is charcoaled and concentrated to obtain the recovered solvent, the pH of which is maintained with fresh alkali and is re-used at least 5 times for subsequent reactions.

* * * * *